United States Patent
Watabe et al.

(10) Patent No.: US 8,109,642 B2
(45) Date of Patent: Feb. 7, 2012

(54) PROJECTION TYPE IMAGE DISPLAY APPARATUS

(75) Inventors: Yasuhisa Watabe, Yokohama (JP);
Nobuyuki Kimura, Yokohama (JP);
Yoshimasa Takeuchi, Yokohama (JP);
Shinro Inui, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 574 days.

(21) Appl. No.: 12/266,586

(22) Filed: Nov. 7, 2008

(65) Prior Publication Data

US 2009/0141254 A1  Jun. 4, 2009

(30) Foreign Application Priority Data

Nov. 29, 2007 (JP) ................. 2007-308155

(51) Int. Cl.
*G03B 21/14* (2006.01)
(52) U.S. Cl. ...................... 353/101; 359/811
(58) Field of Classification Search .......... 353/100, 353/101; 359/811–830
See application file for complete search history.

(56) References Cited

U.S. PATENT DOCUMENTS 6,226,055 B1 * 5/2001 Koba ................. 349/5
7,061,699 B2 * 6/2006 Watanabe et al. ......... 359/819

FOREIGN PATENT DOCUMENTS

| JP | 2003-045041 | 2/2003 |
| JP | 2004-226814 | 8/2004 |
| JP | 2007-322448 | 12/2007 |

* cited by examiner

*Primary Examiner* — Que T Le
*Assistant Examiner* — Jerry Brooks
(74) *Attorney, Agent, or Firm* — Antonelli, Terry, Stout & Kraus, LLP.

(57) ABSTRACT

A projection type image display apparatus comprising a light source, an optical integrator, by which light outgoing from the light source is changed in distribution of illumination, a color separation optical system, by which light outgoing from the optical integrator is separated into a plurality of light beams, and a relay optical system including a plurality of relay lenses, by which light beams separated by the color separation optical system are relayed, and a reflection mirror. The relay optical system includes a device that adjusts angles of inclination of at least one of the relay lenses with respect to an optical axis of illumination of light outgoing from the light source.

10 Claims, 15 Drawing Sheets

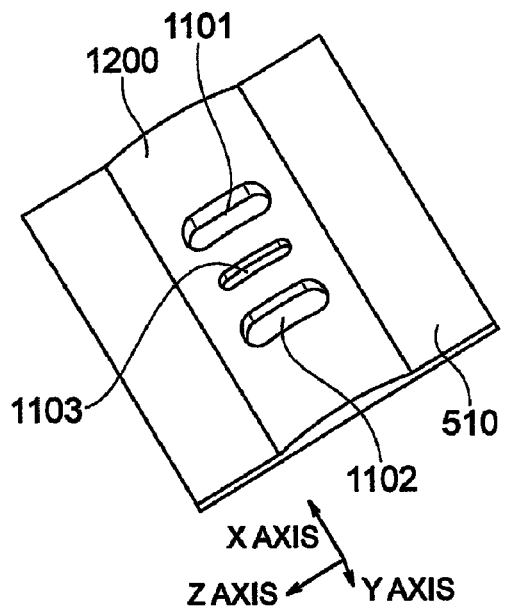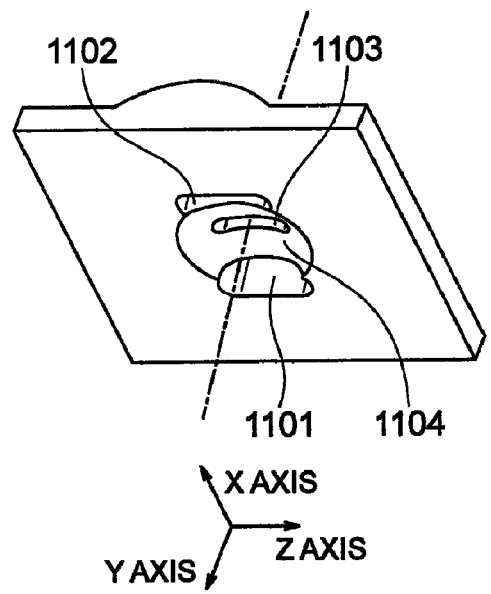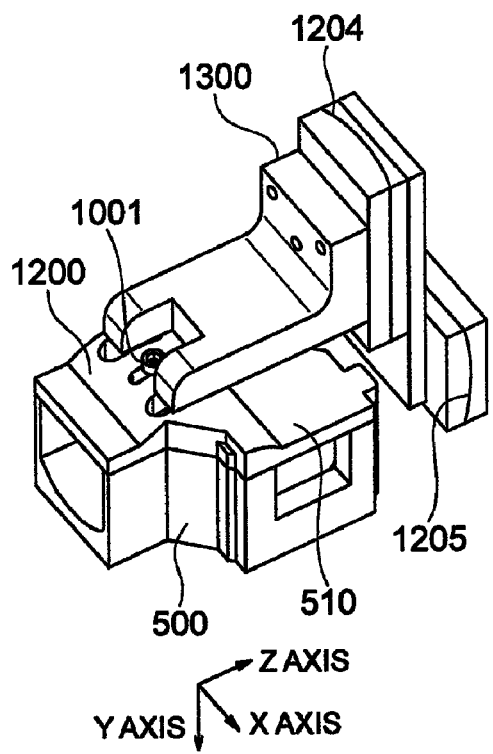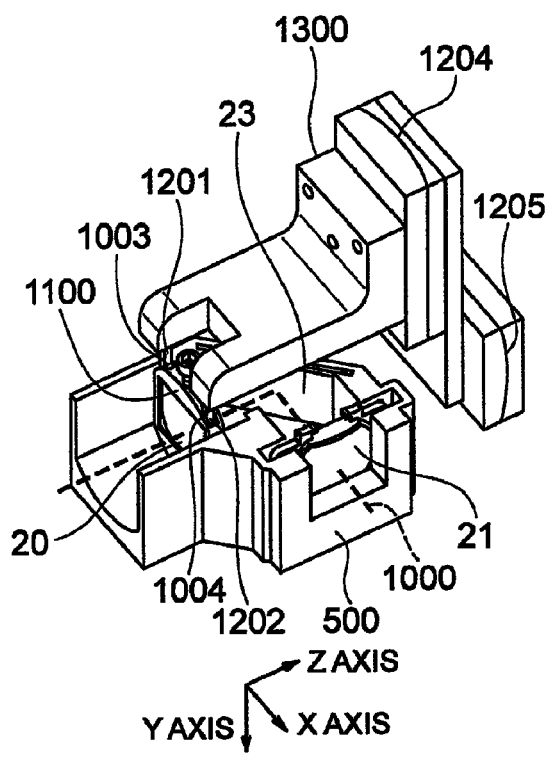

FIG. 12A
R LIGHT ILLUMINATION   G LIGHT ILLUMINATION   B LIGHT ILLUMINATION 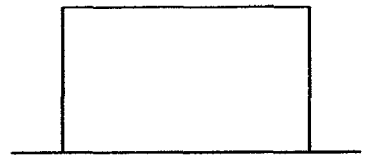
FIG. 12B
R LIGHT ILLUMINATION   G LIGHT ILLUMINATION   B LIGHT ILLUMINATION 
FIG. 12C
R LIGHT ILLUMINATION   G LIGHT ILLUMINATION   B LIGHT ILLUMINATION 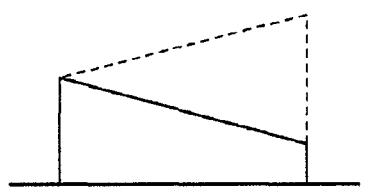

PROJECTION TYPE IMAGE DISPLAY APPARATUS

INCORPORATION BY REFERENCE

The present application claims priority from Japanese application JP2007-308155 filed on Nov. 29, 2007, the content of which is hereby incorporated by reference into this application.

BACKGROUND OF THE INVENTION

The present invention relates to a technology that provides a projection type image display apparatus.

In a three-plate projection type image display apparatus, optical paths, along which respective colored beams of light having been subjected to color separation reach corresponding liquid crystal panels, are different in optical distance (referred appropriately below to as "optical path length") and thus at least light of one color is long in optical path length as compared with light of the remaining colors. Hereupon, a relay optical system is used in an optical path of light of a color, which is long in optical path length, to correct an optical path length thereof, which is disclosed in, for example, JP-A-2004-226814.

By the way, since fluxes of illuminating light are reversed up and down and left and right in a relay optical system as indicated in a paragraph of "a problem to be solved" in JP-A-2004-226814, the distribution of illumination of fluxes of light irradiated onto a liquid crystal panel is reversed up and down and left and right for a liquid crystal panel, onto which light outgoing from a color separation optical system is irradiated through a relay optical system, and for a liquid crystal panel, onto which light outgoing from a color separation optical system is irradiated not through a relay optical system.

Therefore, in the case where a light source involves deviation in distribution of illumination, such deviation appears reversely for a liquid crystal panel, onto which irradiation is made through a relay optical system, and for other liquid crystal panels. That is, regions, onto which light having a relatively intense illumination is irradiated, are present in symmetrical positions.

In other words, since that region on a liquid crystal panel, onto which light having a relatively intense illumination is irradiated through a relay optical system, and that region on a liquid crystal panel, onto which light having a relatively weak illumination is irradiated, are composed on a projected surface, there is caused a circumstance, in which balance in illumination is lost and color shading is generated on a display image.

Hereupon, JP-A-2004-226814 discloses, in FIG. 1, a technology, in which shielding means is arranged in the vicinity of a second relay lens to achieve adjustment of quantity of light, in order to decrease color shading generated by virtue of non-uniformity in distribution of illumination. With the technology disclosed in JP-A-2004-226814, B-light is considerably decreased in quantity of light as shown in FIG. 12c (the distribution of illumination before shading is indicated by broken lines and the distribution of illumination after shading is indicated by solid lines). Therefore, there is caused a problem that balance in light is lost and white balance resulted from superposition of R-light, G-light, and B-light is deteriorated.

The invention has been thought of in view of the situation described above and has its object to provide a projection type image display apparatus, in which color shading is decreased without deterioration in white balance.

SUMMARY OF THE INVENTION

A projection type image display apparatus according to the invention comprise a light source, an optical integrator, by which light outgoing from the light source is changed in distribution of illumination, a color separation optical system, by which light outgoing from the optical integrator is separated into a plurality of light beams, and a relay optical system including a plurality of relay lenses, by which light beams separated by the color separation optical system are relayed, and a reflection mirror, and the relay optical system includes means that adjusts an angle of inclination of at least one of the plurality of relay lenses with respect to an optical axis of illumination of light outgoing from the light source.

The angle adjusting means is provided on that relay lens out of the plurality of relay lenses, which is arranged in a position of a short, optical path length from the light source.

The relay optical system includes a first relay lens that receives light from the light source, a reflection mirror that reflects light passing through the first relay lens, and a second relay lens that receives light from the reflection mirror. An optical axis direction of light directed toward the first relay lens from the light source defines a Z-axis, an optical axis direction of light directed toward the second relay lens from the reflection mirror defines a X-axis, and a direction perpendicular to both the Z-axis and the X-axis defines a Y-axis. The angle adjusting means includes a holding member that holds the first relay lens, a base body that supports the holding member and a fixation member that fixes the holding member and the base body to each other. An upper portion of the base body defines a surface substantially parallel to the Z-axis and the X-axis (or the Y-axis), that surface of the upper portion of the base body, which is brought into contact with the holding member, defines a spherical surface. The upper portion of the base body includes an opening extending in the Z-axis direction. A fixation hole, into which the fixation member enters, is provided on that side of the holding member, which is brought into contact with the upper portion of the base body. The fixation member is passed through the fixation hole from the opening to fix the holding member to the base body. The holding member is turned along the opening in the Z-axis direction to change an angle of the first relay lens about the X-axis (or the Y-axis), and the holding member is turned about the fixation member to change an angle about the Y-axis (or the X-axis).

That surface of the holding member, which is brought into contact with the upper portion of the base body, defines a spherical surface.

That spherical surface of the holding member, which is brought into contact with the upper portion of the base body, and that spherical surface of the upper portion of the base body, which is brought into contact with the holding member, are the same in curvature.

That spherical surface of the holding member, which is brought into contact with the upper portion of the base body, and that spherical surface of the upper portion of the base body, which is brought into contact with the holding member, define concentric, spherical surfaces.

As described above, according to the invention, it is possible to provide a projection type image display apparatus that eliminates deterioration in white balance and decreases color shading even when deviation in distribution of illumination is generated on a side of a light source.

Other objects, features and advantages of the invention will become apparent from the following description of the embodiments of the invention taken in conjunction with the accompanying drawings.

BRIEF DESCRIPTION OF THE DRAWINGS

FIG. 4A and FIG. 4B are perspective views showing a cover plate in the first embodiment;

FIG. 5A and FIG. 5B are perspective views showing the angle adjusting means of the first relay lens in the first embodiment;

FIGS. 12A, 12B, and 12C are views showing states of distribution of illumination;

DESCRIPTION OF THE PREFERRED EMBODIMENTS

Figure 1:
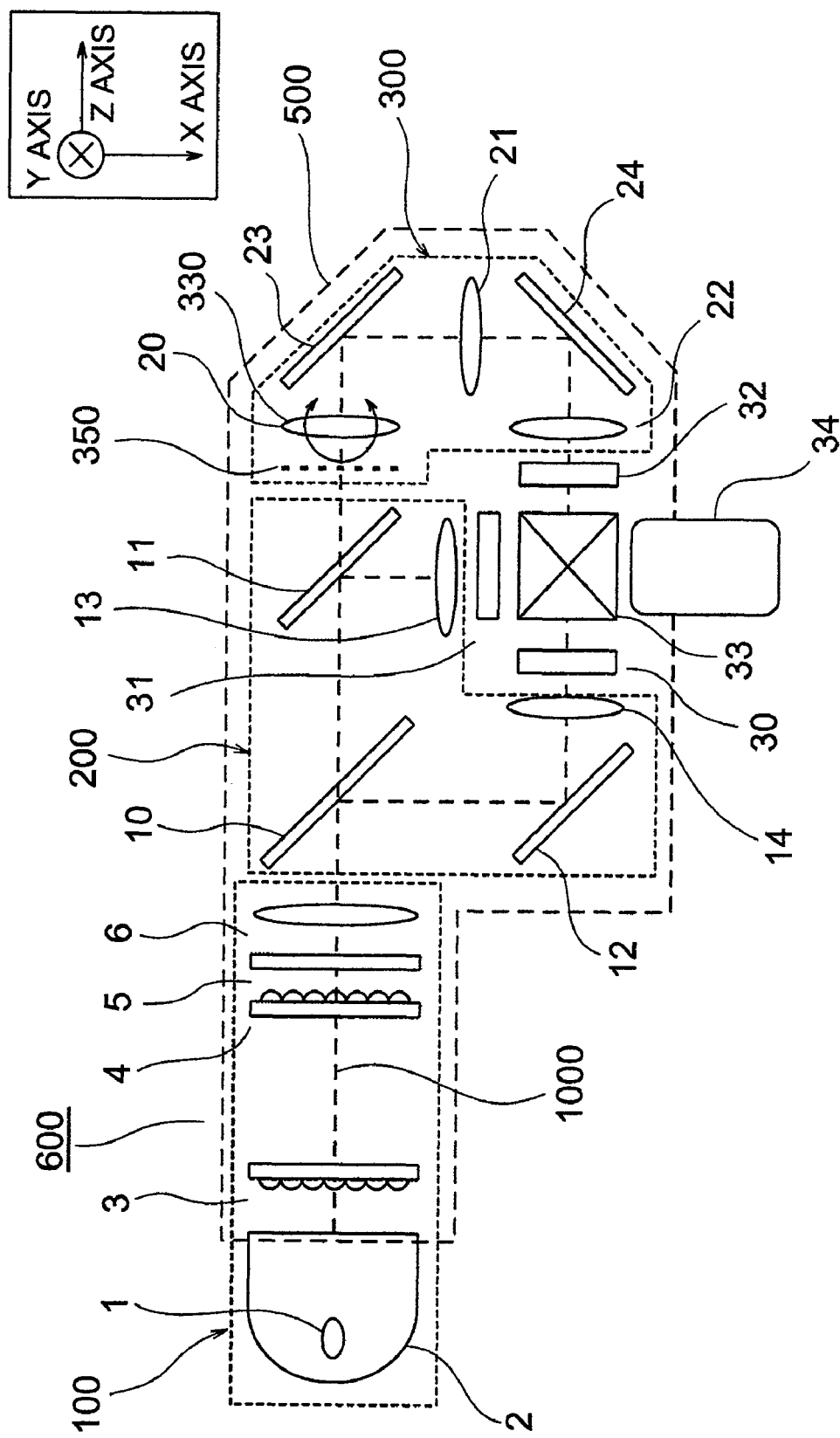
FIG. 1 is a view schematically showing the construction of an optical system of a projection type image display apparatus according to the invention.

The invention will be described hereinafter with reference to the drawings. In addition, the invention is not limited to an example shown in the drawings, the same parts in the respective drawings are denoted by the same reference numerals, and an explanation for parts having been once illustrated is omitted.

FIG. 1 is a view schematically showing the construction of an optical system of a projection type image display apparatus according to the invention. Here, a liquid crystal panel is used as an image display element.

As shown in FIG. 1, the optical system of the projection type image display apparatus comprises an illumination optical system 100 mounted to a base body 500, a color separation optical system 200, a relay optical system 300, two condenser lenses 13, 14, three liquid crystal panels 30, 31, 32, a light combination prism 33, and a projection lens 34.

These optical elements are mounted on the base body 500 to constitute an optical unit 600, the optical unit 600 is mounted on a housing (not shown) together with a drive circuit (not shown) for driving of liquid crystal panels and a power circuit (not shown) to constitute a projection type image display apparatus.

A lamp 1 as a light source accommodated in a reflector 2 is used for the illumination optical system 100. While the reflector 2 is not limited in shape, a reflecting surface in the form of a paraboloid of revolution arranged so as to cover the lamp 1 from behind is adopted as an example therefor.

Also, a circular or polygonal outgoing opening is formed in a light outgoing direction from the reflector 2. It is possible to use a white lamp, such as extra-high voltage mercury lamp, metal halide lamp, xenon lamp, mercury xenon lamp, halogen lamp, etc., for the lamp 1.

A first array lens 3 is arranged in an outgoing direction of light from the reflector 2 and a second array lens 4 is arranged on a light outgoing surface side of the first array lens 3. Also, a polarization-conversion element 5 is arranged on a light outgoing surface side of the second array lens 4.

The first array lens 3 comprises a plurality of lens cells arranged in a matrix (two-dimensional) manner to have a rectangular shape being substantially similar to the liquid crystal panel as viewed in a direction, in which an illumination optical axis 1000 extends, and light incident from the light source is divided into a plurality of light beams by the plurality of lens cells to be lead in a manner to efficiently pass through the second array lens 4 and the polarization-conversion element 5. That is, the first array lens 3 is designed so that the lamp 1 and the respective lens cells of the second array lens 4 are put in an optically conjugate relationship.

Like the first array lens 3, the second array lens 4 comprises a plurality of lens cells arranged on one of lens surfaces thereof in a matrix manner to have a rectangular shape as viewed in a direction, in which the illumination optical axis 1000 extends, and the second array lens 4 is structured so that the constituent lens cells thereof project (map) shapes of the corresponding lens cells of the first array lens 3 onto the liquid crystal panels 30, 31, 32.

The polarization-conversion element 5 is structured so as to cause light outgoing from the second array lens 4 to be arranged in a predetermined direction of polarization.

A condensing lens 6 is arranged on a light outgoing surface side of the polarization-conversion element 5. Since the respective lens cells of the first array lens 3 and the liquid crystal panels 30, 31, 32 are designed to be put in an optically conjugate relationship, a plurality of fluxes of light divided by the first array lens 3 is projected by the second array lens 4 and the condensing lens 6 to be superimposed on the liquid crystal panels 30, 31, 32 with a certain distribution of illumination.

In addition, an illumination optical system 100 comprises the lamp 1, the first array lens 3, the second array lens 4, the polarization-conversion element 5, and the condensing lens 6, and an optical integrator comprises the first array lens 3, the second array lens 4, the polarization-conversion element 5, and the condensing lens 6. The illumination optical system 100 makes it possible to uniformly illuminate the liquid crystal panels while arranging light, a direction of polarization of which is random, in a predetermined direction of polarization.

A first dichroic mirror 10 is arranged on a light outgoing surface side of the condensing lens 6. The first dichroic mirror 10 is structured to reflect R-light and to transmit therethrough G-light and B-light.

A reflection mirror 12 is arranged in an advancing direction of R-light reflected by the first dichroic mirror 10, and the first condenser lens 14 is arranged in the advancing direction of R-light reflected by the reflection mirror 12. The first condenser lens 14 is structured to condense R-light, and the first liquid crystal panel 30 being an image display element is arranged on a light outgoing surface side of the first condenser lens 14. The light combination prism 33 is arranged on a light outgoing surface side of the first liquid crystal panel 30.

Also, a second dichroic mirror 11 is arranged in an advancing direction of G-light and B-light having transmitted through the first dichroic mirror 10. The second dichroic mirror 11 is structured to reflect G-light and to transmit therethrough B-light. The second condenser lens 13 is arranged in the advancing direction of G-light reflected by the second dichroic mirror 11, and the second liquid crystal panel 31 is arranged on that surface side of the second condenser lens 13, from which G-light outgoes. The light combination prism 33 is arranged on a light outgoing surface side of the second liquid crystal panel 31 for G-light.

A first relay lens 20 is arranged in an advancing direction of B-light having transmitted through the second dichroic mirror 11. A reflection mirror 23 is arranged on a light outgoing surface side of the first relay lens 20. A second relay lens 21 is arranged in an advancing direction of B-light reflected by the reflection mirror 23 and a reflection mirror 24 is arranged on a light outgoing surface side of the second relay lens 21.

A third relay lens 22 is arranged in an advancing direction of B-light reflected by the reflection mirror 24. The third liquid crystal panel 32 for B-light is arranged on a light outgoing surface side of the third relay lens 22 and the light combination prism 33 is arranged on a light outgoing surface side of the third liquid crystal panel 32.

The light combination prism 33 is structured to compose a color image from R-light, G-light, and B-light, which enter from the first, second and third liquid crystal panels 30, 31, 32, and to have the composed color image outgoing. A projection lens 34 comprising, for example, a zoom lens is arranged on a color-image outgoing surface side of the light combination prism 33, and the projection lens 34 is structured to enlarge and project an incident color image onto a screen (not shown).

The color separation optical system 200 comprises the first and second dichroic mirrors 10, 11 and the reflection mirror 12, and the relay optical system 300 comprises the first relay lens 20, the reflection mirror 23, the second relay lens 21, the reflection mirror 24, and the third relay lens 22.

Also, according to the embodiment, R-light is first separated from the light, which outgoes from the light source, and then, G-light and B-light are separated but that order, in which the light outgoing from the light source is separated, is not limitative. First, G-light or B-light may be separated from the light, which outgoes from the light source, and the light of the remaining two colors may be then separated.

An optical path length (B-optical path length) to a liquid crystal panel for B-light from the light source is longer than an optical distance (the optical distance is referred hereinafter to as "optical path length", and for example, an optical path length of R-light is referred to as "R-optical path length") and an optical path length (G-optical path length) to the second liquid crystal panel 31 for G-light from the light source. The relay optical system 300 serves to correct the optical path length.

A virtual liquid crystal display image 350, on which images of the respective lens cells of the first array lens 3 overlap, is imaged in the vicinity of the first relay lens 20 on a B-optical path by the illumination optical system 100. The relay optical system 300 is intended for relaying (mapping) the virtual liquid crystal display image 350 to the third liquid crystal panel 32 for B-light. That is, the second relay lens 21 being an intermediate lens of the relay optical system 300 maps the virtual liquid crystal display image 350 on the third liquid crystal panel 32 for B-light. In other words, the virtual liquid crystal display image 350 and the third liquid crystal panel 32 are put in an article-image relationship.

The first relay lens 20 being an incident side lens of the relay optical system 300 condenses light, which having passed through the virtual liquid crystal display image 350, onto the second relay lens 21 so that an image imaged on the third liquid crystal panel 32 is made uniform every nook and corner in illumination. Plural of arc images formed on the second array lens 4 are formed on the second relay lens 21. That is, the second array lens 4 and the second relay lens 21 are put in an article-image relationship.

Angle adjusting means 330 is provided on the first relay lens 20. The angle adjusting means 330 inclines an optical axis of the first relay lens 20 to the illumination optical axis 1000 to adjust deviation in distribution of illumination on the third liquid crystal panel 32 used for B-light.

The angle adjusting means 330 will be described in detail hereinafter with reference to the drawings. Here, with a view to facilitating an explanation, a rectangular coordinate system is used. In the rectangular coordinate system used here, a direction, in which the illumination optical axis 1000 extends, is made a Z-axis direction, and a direction in parallel to a direction of gravity in a plane perpendicular to the Z-axis is made a Y-axis direction. A direction perpendicular to the Y-axis in a plane perpendicular to the Z-axis is made a X-axis direction. A rectangular coordinate system used hereinafter is also made the same as the rectangular coordinate system used here.

Of course, the rectangular coordinate system is not limitative. For example, a direction, which is an optical axis direction of light directed toward the first relay lens 20 from the light source and in which the illumination optical axis 1000 extends, is made a Z-axis, and in the case where light transmitting through the first relay lens 20 is reflected by the reflection mirror 23 to be reflected toward the second relay lens 21, a direction of light directed toward the second relay lens 21 from the reflection mirror 23 may be made a X-axis and a direction perpendicular to both the Z-axis and the X-axis may be made a Y-axis. In this case, the Z-axis and the X-axis are not necessarily made perpendicular to each other.

Figure 2A:
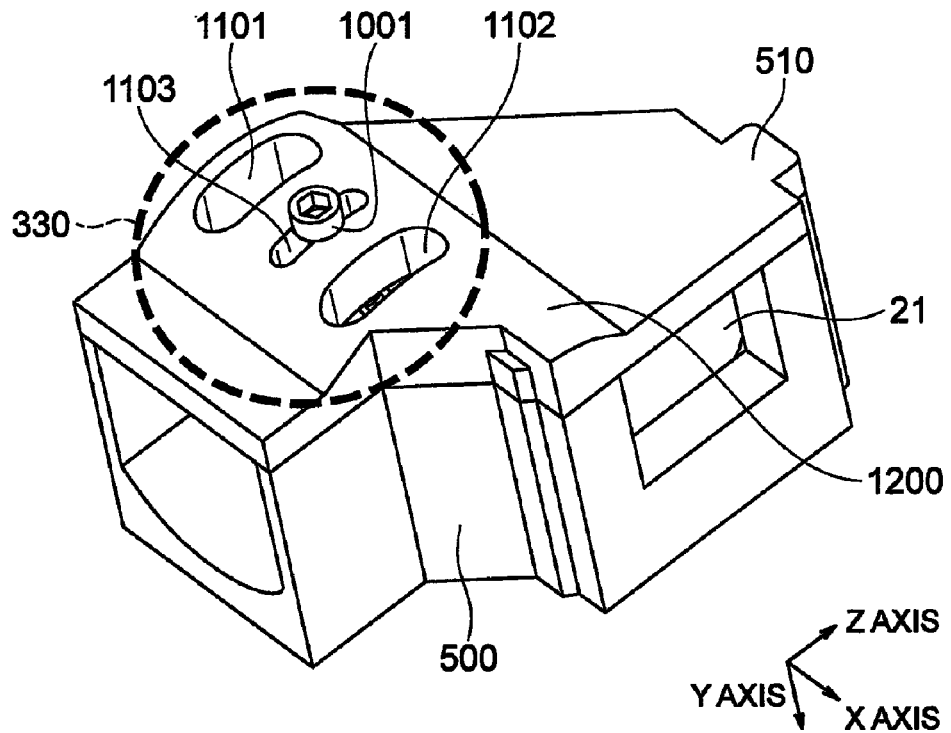
FIG. 2A and FIG. 2B are perspective views showing the neighborhood of angle adjusting means of a first relay lens in a first embodiment of the projection type image display apparatus according to the invention.
Figure 2B:
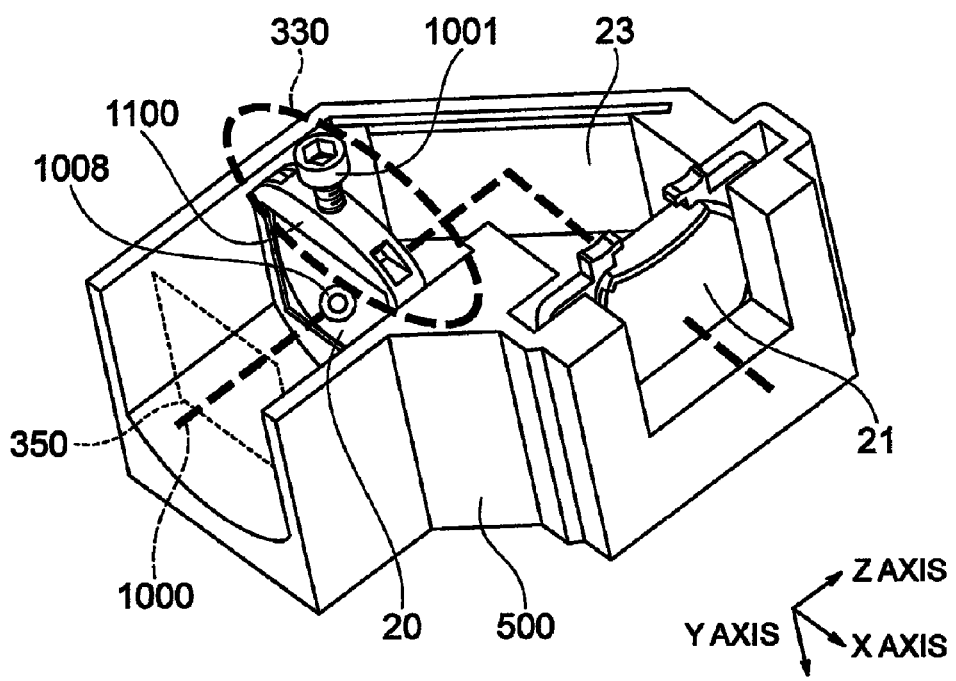

FIG. 2A and FIG. 2B are perspective views showing the neighborhood (here, a region, in which light transmits through the second relay lens 21 via the reflection mirror 23 from the virtual liquid crystal display image 350) of the angle adjusting means 330 of the first relay lens 20. FIG. 2A shows a manner, in which a cover plate 510 is mounted, and FIG. 2B is a view with the cover plate 510 removed for the sake of explanation. As shown in the drawings, optical parts such as the first relay lens 20, the second relay lens 21, etc. are arranged in predetermined positions on the base body 500 and covered by the cover plate 510.

The angle adjusting means 330 comprises a holding member 1100, to which the first relay lens 20 is mounted, the cover plate 510, and a screw 1001. A fixation slot 1103 and two angle adjustment slots 1101, 1102, which comprise a slot being lengthy in the Z-axis direction, are formed on an upper surface 1200 of the cover plate 510 above the first relay lens 20. After the holding member 1100 (the first relay lens 20) is angularly adjusted, the holding member 1100 is fixed to the cover plate 510 through the fixation slot 1103 by the screw 1001. Respective parts will be described hereinafter.

Figure 3:
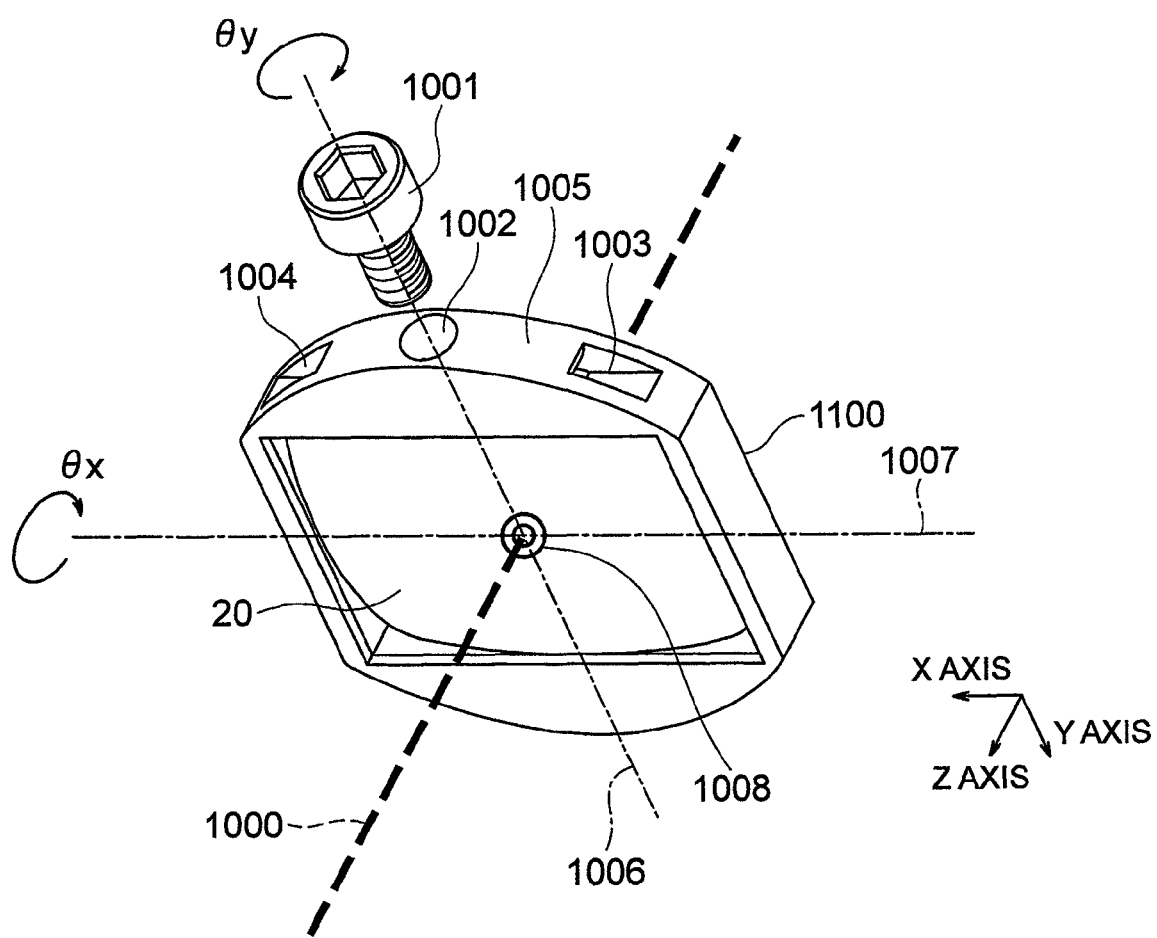
FIG. 3 is a perspective view showing a member that holds the first relay lens in the first embodiment.

FIG. 3 is a perspective view of the holding member 1100. A turning center 1008 is one when the first relay lens 20 is to be adjusted, and will be described hereinafter in detail. The turning center 1008 is positioned on the illumination optical axis 1000, an axis passing through the turning center 1008 and being in parallel to the Y-axis is denoted by 1006, and an axis in parallel to the X-axis is denoted by 1007. Rotation about the axis 1006 is indicated by $\theta_y$ and rotation about the axis 1007 is indicated by $\theta_x$.

The holding member 1100 holds the first relay lens 20 at side edges thereof not to intercept light transmitting through the first relay lens 20. An upper surface 1005 of the holding member 1100 defines a spherical surface centered on the turning center 1008. A threaded hole 1002 is provided on the upper surface 1005 and the holding member 1100 is fixed to the cover plate 510 by the screw 1001. Further, holding holes 1003, 1004 are provided on the upper surface 1005.

FIG. 4A and FIG. 4B show the cover plate 510 in the vicinity of the first relay lens 20. As described above, the cover plate 510 is provided with the fixation slot 1103 and the angle adjustment slots 1101, 1102. The fixation slot 1103 is a slot being lengthy in the Z-axis direction and having a little larger hole width than an outside diameter of thread ridges of the screw 1001.

The upper surface 1200 of the cover plate 510 is columnar-shaped and centered on the axis 1007 passing through the turning center 1008. As shown in FIG. 4B, a side of the cover plate 510 toward the holding member 1100 is formed with a spherical surface 1104, which has the same curvature as that of the upper surface 1005 of the holding member 1100.

In FIG. 2A, the cover plate 510 defines a surface substantially in parallel to the Z-axis and the X-axis and is provided with the fixation slot 1103. An angle of the first relay lens 20 about the X-axis is changed and adjusted by turning the holding member 1100 along the fixation slot 1103 in the Z-axis direction and an angle thereof about the Y-axis is changed and adjusted by turning the holding member 1100 about the screw 1001.

However, in changing and adjusting the angle, the relationship about the X-axis and the relationship about the Y-axis may be replaced by each other. In such case, the cover plate 510 may define a surface substantially in parallel to the Z-axis and the Y-axis and the fixation slot 1103 may be provided so that an angle of the first relay lens 20 about the Y-axis is changed and adjusted by turning the holding member 1100 along the fixation slot 1103 in the Z-axis direction and an angle thereof about the X-axis is changed and adjusted by turning the holding member 1100 about the screw 1001.

Subsequently, referring to FIGS. 5A to 7, an explanation will be given to a method of adjusting the angle adjusting means 330.

Figure 6:
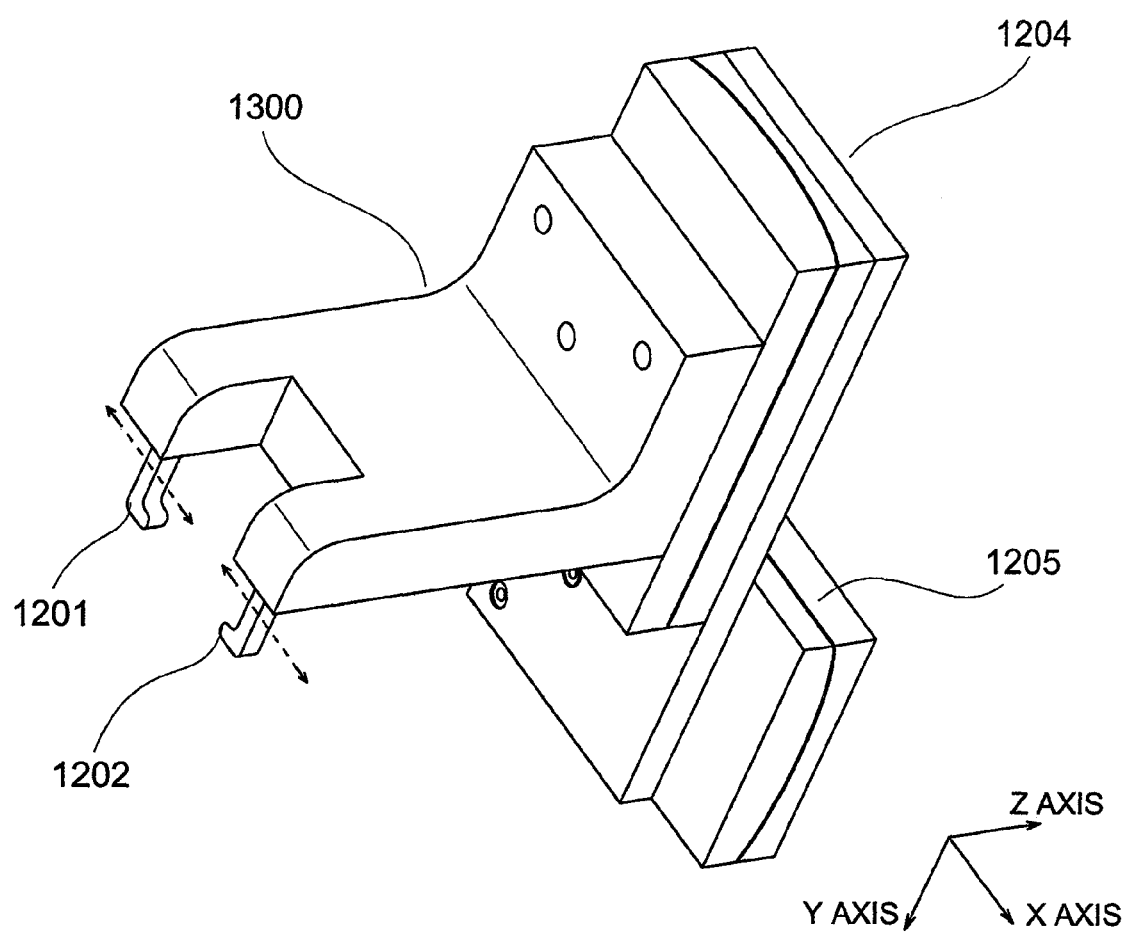
FIG. 6 is a perspective view showing an angle adjusting jig for the first relay lens in the first embodiment.

FIG. 5A is a perspective view showing a state, in which an adjusting jig 1300 is mounted to the holding member 1100 and FIG. 5B is a view showing a state, in which the cover plate 510 is removed with a view to explaining an interior. As shown in FIGS. 5A, 5B and 6, the adjusting jig 1300 comprises chuck members 1201, 1202 and goniostages 1204, 1205. The goniostage 1205 is fixed to a jig (not shown). The chuck members 1201, 1202, respectively, are joined to the holding holes 1003, 1004 whereby the holding member 1100 can be angularly adjusted by the adjusting jig 1300.

FIG. 6 is a view showing the adjusting jig 1300. As described above, the chuck members 1201, 1202 can be joined to the holding holes 1003, 1004 (not shown) of the holding member 1100 and the adjusting jig can be joined to and released from the holding member 1100 by opening and closing the chuck members 1201, 1202 in an arrow direction in the drawing.

Figure 7:
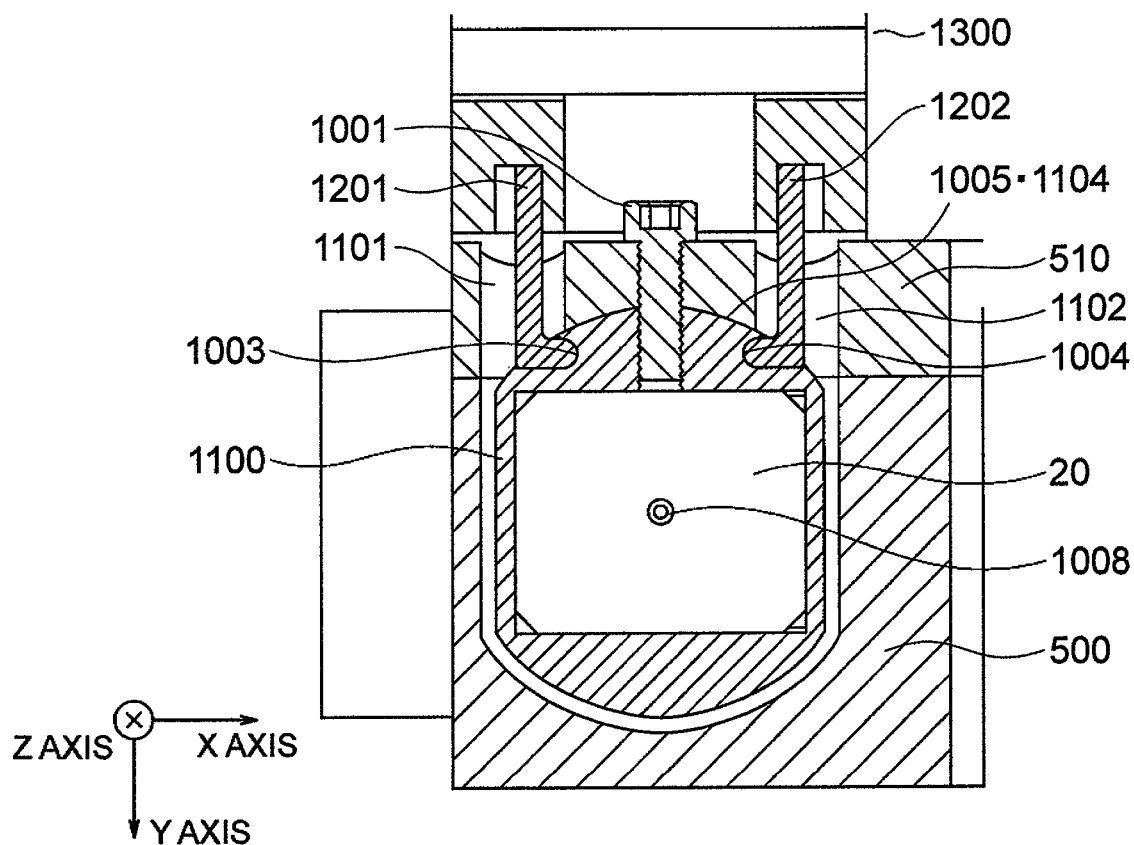
FIG. 7 is a cross sectional view showing the angle adjusting means for the first relay lens in the first embodiment.

FIG. 7 is a cross sectional view taken along a plane perpendicular to the illumination optical axis 1000 at the turning center 1008 of the first relay lens 20. FIG. 7 shows a state, in which the chuck members 1201, 1202 are closed, and the chuck members 1201, 1202 are joined to the holding holes 1003, 1004 of the holding member 1100. The chuck members 1201, 1202 are released from the holding holes 1003, 1004 by opening the chuck members 1201, 1202 in a direction away from the screw 1001 from a state shown in FIG. 7.

As shown in FIG. 7, the chuck members 1201, 1202 can be inserted into the adjustment slots 1101, 1102 provided on the cover plate 510, and the adjusting jig 1300 can be dismounted from the holding member 1100 by opening the chuck members 1201, 1202 after adjustment and releasing the holding member 1100. At this time, the adjustment slots 1101, 1102 have a length and a width not to interfere with the chuck members 1201, 1202. When connection is performed by the screw 1001 after adjustment, the spherical surface 1005 of the holding member 1100 and the spherical surface 1104 of the cover plate 510 are brought into close contact with each other to afford strong holding.

Figure 8:
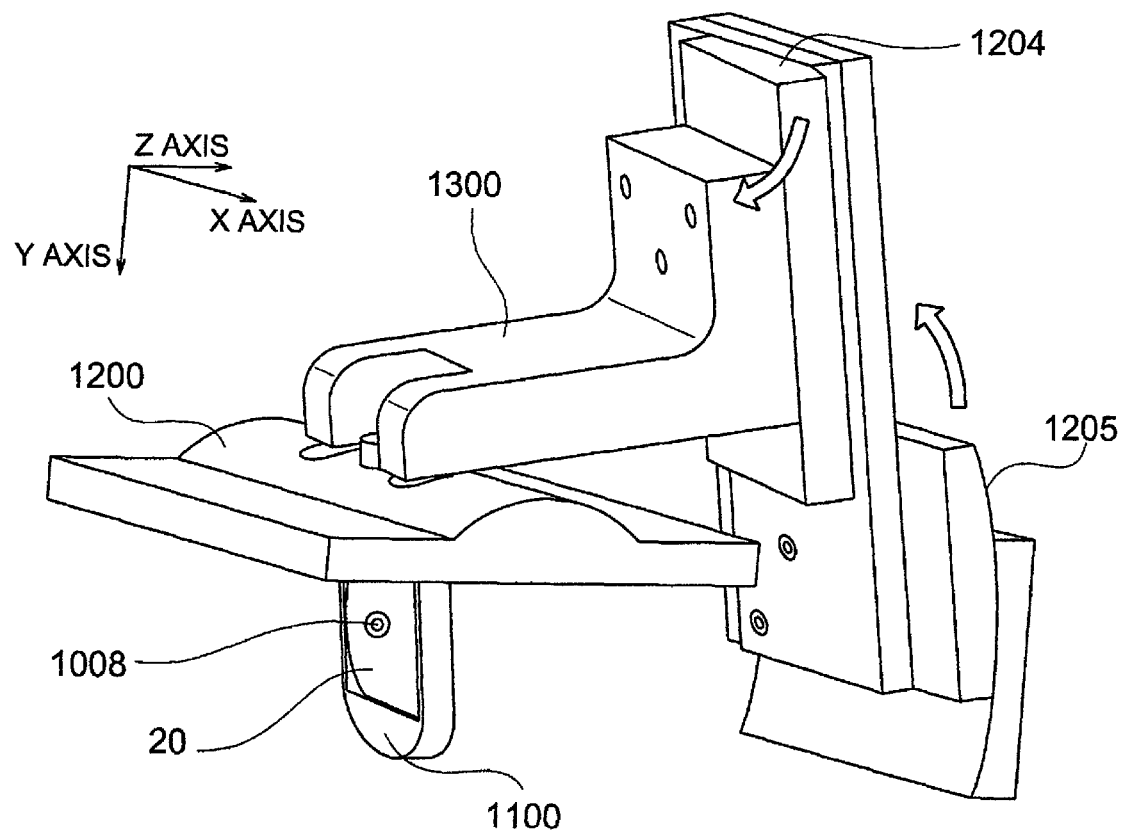
FIG. 8 is a perspective view illustrating an angle adjusting method with the angle adjusting means of the first relay lens in the first embodiment.

FIG. 8 is a view showing a manner, in which angular adjustment is being accomplished by the adjusting jig and the first relay lens 20 can be turned in association with the operation of the goniostages 1204, 1205 by arranging the adjusting jig 1300 in a predetermined position.

Figure 9A:
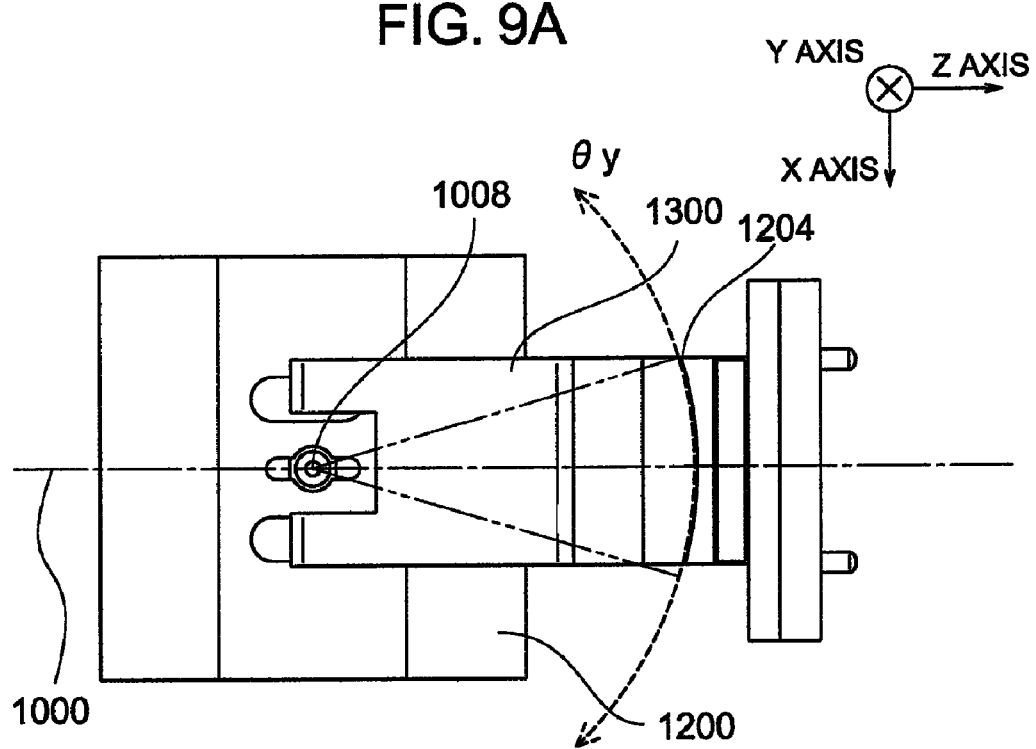
FIG. 9A and FIG. 9B are a plan view and a side view showing the angle adjusting means for the first relay lens in the first embodiment.

FIG. 9A is a view showing the adjusting jig 1300 as viewed from above and an example when the first relay lens 20 is turned $\theta_y$ about the turning center 1008. As shown in FIG. 9A, the goniostage 1204 is mounted to the adjusting jig 1300 to be oriented so as to enable turning in a direction ($\theta_y$ direction) indicated by an arrow shown by a broken line. Since the adjusting jig 1300 is joined to the holding member 1100 by the chuck members 1201, 1202, the adjusting jig 1300 is turned whereby the holding member 1100 is also turned.

Figure 9B:
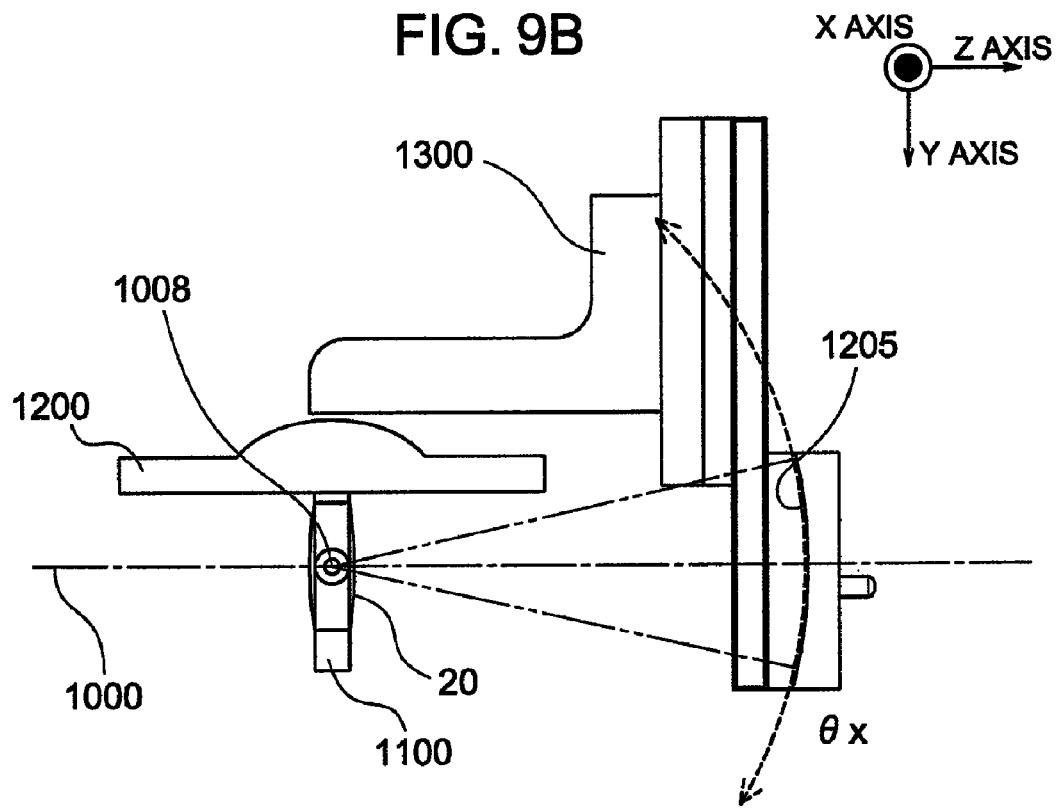

A turning center of the goniostage 1204 agrees with the turning center 1008 of the first relay lens 20. Thereby, when the goniostage 1204 is turned to change an angle $\theta_y$ of the adjusting jig 1300, an angle $\theta_y$ of the first relay lens 20 is changed without positional movement of the turning center 1008. FIG. 9B is a view showing the adjusting jig 1300 as viewed from laterally and an example when the first relay lens 20 is turned $\theta_x$ about the turning center 1008. As shown in the FIG. 9B, the goniostage 1205 is assembled to the adjusting jig 1300 to be oriented so as to enable turning in a direction ($\theta_x$ direction) indicated by a broken line arrow.

As is in FIG. 9A, since a turning center of the goniostage 1205 agrees with the turning center 1008 of the first relay lens 20, when the goniostage 1205 is turned to change an angle $\theta_x$ of the adjusting jig 1300, an angle $\theta_x$ of the first relay lens 20 is changed without movement of the turning center 1008. This turning is performed independently of turning in the $\theta_y$ direction described above.

After the first relay lens 20 is adjusted by the adjusting jig 1300, connection between the chuck members 1201, 1202 and the holding member 1100 is released, so that it becomes possible to dismount the adjusting jig 1300. That is, by using the adjusting jig 1300 when an angle of the first relay lens 20 is to be adjusted and dismounting the adjusting jig after adjustment, it becomes possible to make the optical unit 600 small in size without the necessity of providing any adjusting mechanism on the optical unit 600.

Figure 10A:
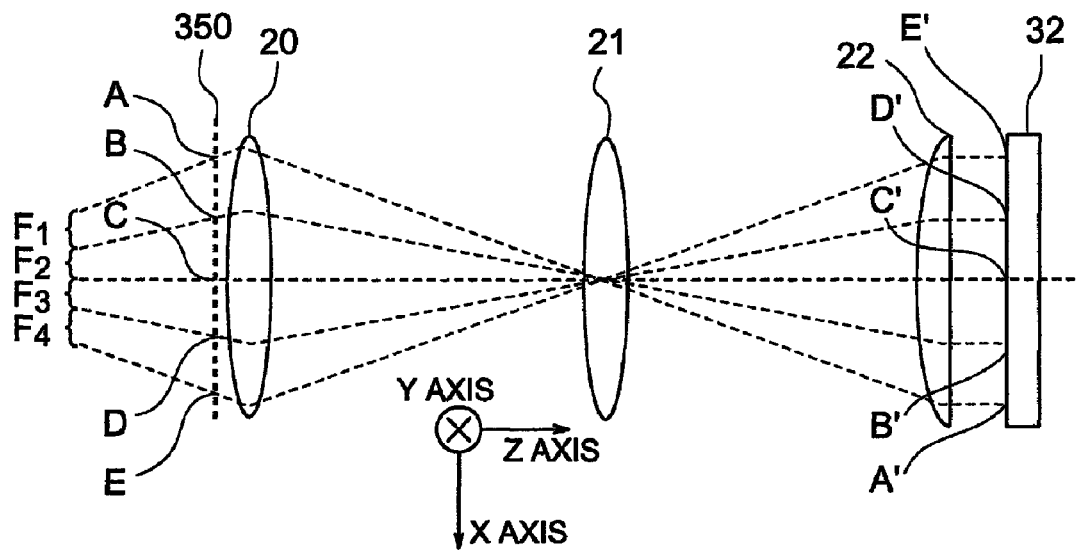
FIGS. 10A, 10B, and 10C are a schematic view showing an essential part in the case where lens surfaces of the first relay lens are arranged perpendicularly to an optical axis of illumination and views illustrating the distribution of illumination.

Subsequently, an explanation will be given to that change in distribution of illumination, which is caused by angularly adjusting the first relay lens 20. FIGS. 10A to 10C and FIGS. 11A to 11C are X-Z cross sectional views showing, in enlarged scale, the construction of an essential part extending to the third liquid crystal panel 32 for B-light from the first relay lens 20 of the relay optical system and including the illumination optical axis 1000 as linearly represented. FIG. 10A is a view showing beams of light in the case where the first relay lens 20 is arranged so as to make lens surfaces thereof perpendicular to the illumination optical axis 1000 and FIG. 11A is a view showing beams of light in the case where the first relay lens 20 is turned about a turning center 1108.

Figure 10B:
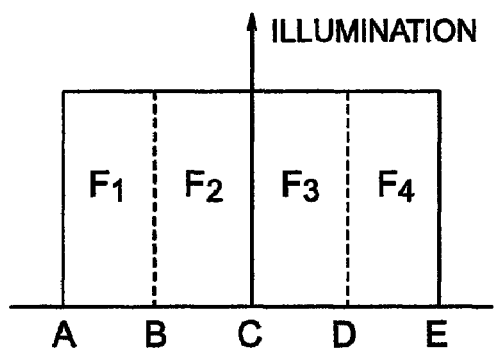
Figure 10C:
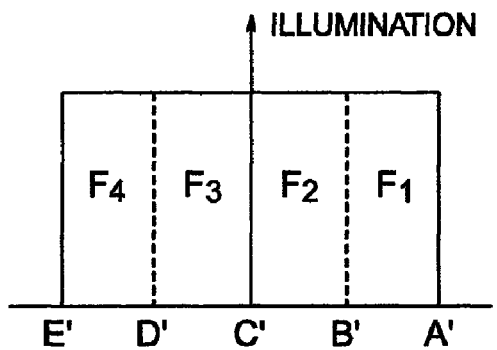
Figure 11A:
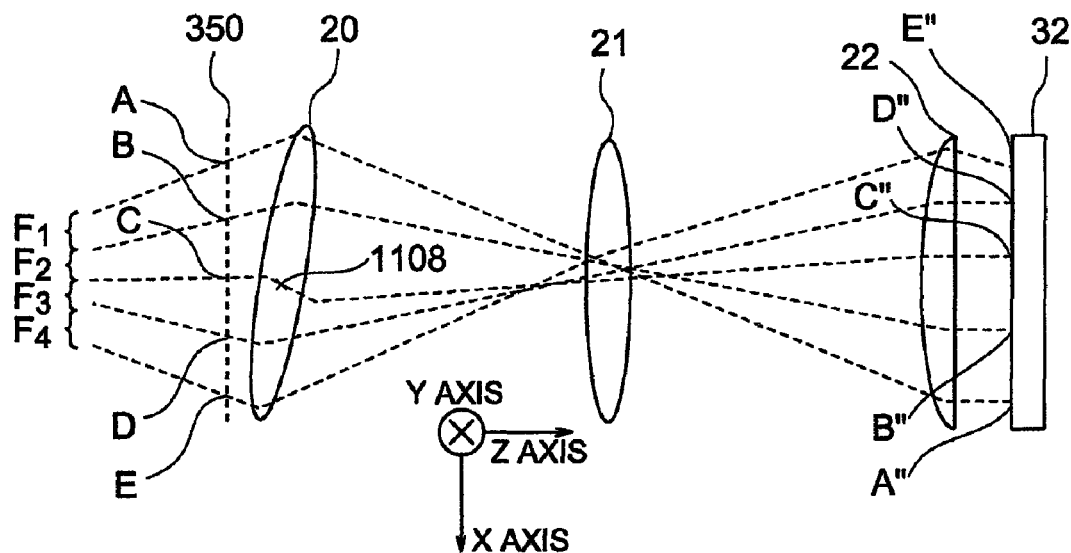
FIGS. 11A, 11B, and 11C are a schematic view showing the essential part in a state, in which the lens surfaces of the first relay lens are inclined at a predetermined angle to the optical axis of illumination and views illustrating the distribution of illumination.

In FIGS. 10A to 10C, light incident upon the first relay lens 20 is converged by the first relay lens 20 and comes to focus in the vicinity of the second relay lens 21. After having passed through the second relay lens 21, diverging beams of light are made in parallel to the illumination optical axis 1000 by the third relay lens 22 to be incident upon the third liquid crystal panel 32. The second relay lens 21 serves to map that image out of the virtual liquid crystal display image 350 formed in the vicinity of the first relay lens 20, which is uniform in illumination in the X-axis direction, onto the third liquid crystal panel 32.

Here, A, B, C, D, and E denote arbitrary points in the X-Z cross section including the illumination optical axis 1000 on a plane of the virtual liquid crystal display image 350, which is formed in the vicinity of the first relay lens 20 to have a rectangular shape similar to the third liquid crystal panel. $G_{AB}$, $G_{BC}$, $G_{CD}$, and $G_{DE}$, respectively, are characters of regions divided by straight lines extending in parallel to the X-axis direction from the points A, B, C, D, and E on the plane of the rectangular-shaped, virtual liquid crystal display image 350.

For example, $G_{AB}$ indicates a region between the point A and the point B. Characters F1, F2, F3, and F4 indicate quantities of light included in the regions $G_{AB}$, $G_{BC}$, $G_{CD}$, and $G_{DE}$. Points, at which beams of light having passed through the respective points A, B, C, D, and E on the plane of the virtual liquid crystal display image 350 intersect the third liquid crystal panel 32, are denoted by A', B', C', D', and E', respectively, in FIG. 10A, and denoted by A", B", C", D", and E", respectively, in FIG. 11A.

Assuming that distances between AB, BC, CD, and DE are equal to one another, the distribution of illumination on the plane of the virtual liquid crystal display image 350 is uniform like the distribution of illumination shown in FIG. 10B, so that the quantities F1, F2, F3, and F4 of light, respectively, become equal to one another. Accordingly, the relationship in illumination among the respective regions $G_{AB}$, $G_{BC}$, $G_{CD}$, and $G_{DE}$ is made as shown in FIG. 10B and can be represented by Formula 1.

$$F1/S_{AB}=F2/S_{BC}=F3/S_{CD}=F4/S_{DE} \quad \text{(Formula 1)}$$

Here, $S_{AB}$, $S_{BC}$, $S_{CD}$, and $S_{DE}$, respectively, denote areas of the regions $G_{AB}$, $G_{BC}$, $G_{CD}$, and $G_{DE}$.

In the case where lens surfaces of the first relay lens 20 are not inclined to the illumination optical axis 1000, distances between A'B', B'C', C'D', and D'E' are equal to one another and the quantities F1, F2, F3, and F4 of light, respectively, are equal to one another, so that the distribution of illumination on the third liquid crystal panel becomes uniform. Accordingly, the illumination of regions $G_{A'B'}$, $G_{B'C'}$, $G_{C'D'}$, and $G_{D'E'}$, respectively, on the third liquid crystal panel corresponding to the regions $G_{AB}$, $G_{BC}$, $G_{CD}$, and $G_{DE}$ becomes as shown in FIG. 10C and can be represented by Formula 2.

$$F1/S_{A'B'}=F2/S_{B'C'}=F3/S_{C'D'}=F4/S_{D'E'} \quad \text{(Formula 2)}$$

Here, $S_{A'B'}$, $S_{B'C'}$, $S_{C'D'}$, and $S_{D'E'}$ denote areas of regions $G_{A'B'}$, $G_{B'C'}$, $G_{C'D'}$, and $G_{D'E'}$.

In addition, the abscissa of a graph shown in FIG. 10B means a position on a plane of the virtual liquid crystal display image 350 in the X-axis direction and the ordinate means intensity of illumination in a position on the plane of the virtual liquid crystal display image 350 in the X-axis direction. Also, the abscissa of a graph shown in FIG. 10C means a position of the third liquid crystal panel 32 in the X-axis direction and the ordinate means intensity of illumination in a position of the third liquid crystal panel 32 in the X-axis direction.

Subsequently, the distribution of illumination is represented in the case where the lens surfaces of the first relay lens 20 are inclined to the illumination optical axis 1000. Since distances between AB, BC, CD, and DE are equal to one another in the case where the first relay lens 20 is inclined as shown in FIG. 11A, the distribution of illumination on the plane of the virtual liquid crystal display image 350 is uniform like the distribution of illumination shown in FIG. 11B but distances A"B", B"C", C"D", and D"E" are not equal to one another, so that A"B">B"C">C"D">D"E" is resulted.

Figure 11B:
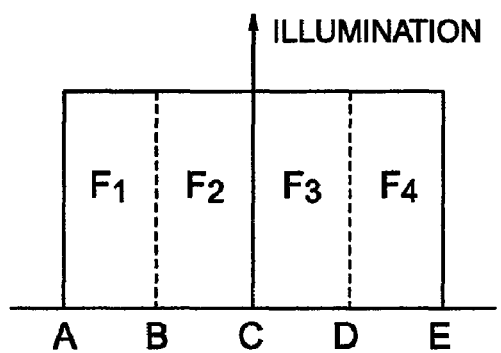
Figure 11C:
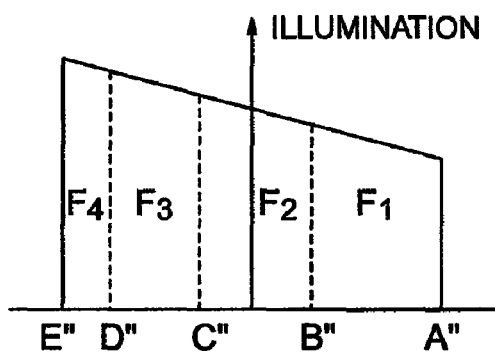

Since all the quantities F1, F2, F3, and F4 of light are equal to one another, the distribution of illumination on the liquid crystal panels can be represented by Formula 3 and are made non-uniform like the distribution of illumination shown in FIG. 11C.

$$F1/S_{A''B''}<F2/S_{B''C''}<F3/S_{C''D''}<F4/S_{D''E''} \quad \text{(Formula 3)}$$

Here, $S_{A''B''}$, $S_{B''C''}$, $S_{C''D''}$, and $S_{D''E''}$ denote areas of the regions $G_{A''B''}$, $G_{B''C''}$, $G_{C''D''}$, and $G_{D''E''}$.

In addition, the abscissa of a graph shown in FIG. 11B means a position on the plane of the virtual liquid crystal display image 350 in the X-axis direction and the ordinate means intensity of illumination in a position on the plane of the virtual liquid crystal display image 350 in the X-axis direction. Also, the abscissa of a graph shown in FIG. 11C means a position of the third liquid crystal panel 32 in the X-axis direction and the ordinate means intensity of illumination in a position of the third liquid crystal panel 32 in the X-axis direction.

As described above, by inclining the first relay lens 20 to the illumination optical axis 1000, it is possible to adjust the distribution of illumination of light projected onto the liquid crystal panel 32. That is, even when the quantities F1, F2, F3, and F4 of light are made non-uniform by dispersion of the light source or the like to cause generation of color shading, correction, which makes the distribution of illumination of B-light the same in shape as those of R-light and G-light without reduction in quantity of light, can be made by turning the first relay lens 20 about the turning center 1008 on the illumination optical axis 1000 to incline the same in a predetermined direction, thus enabling decreasing the color shading.

As described above, by angularly adjusting the first relay lens 20, it is possible to maintain balance of colors without reduction in quantity of light and to decrease color shading without deterioration in white balance.

Subsequently, the operation of the embodiment will be described.

When a power source of the projection type image display apparatus is made ON, light outgoing from the lamp 1 is reflected by the reflecting surface of the reflector 2 to be irradiated onto the first array lens 3. The light irradiated onto the first array lens 3 is divided into a plurality of beams of light by the plurality of lens cells of the first array lens 3 and then irradiated onto the second array lens 4. The light beams irradiated onto the second array lens 4 transmit through the plurality of lens cells of the second array lens 4 and then irradiated onto the polarization-conversion element 5.

The light beams irradiated onto the polarization conversion element 5 are irradiated onto the condensing lens 6 after directions of polarization thereof are aligned in a predetermined direction. The light beams irradiated onto the condensing lens 6 are converged and then irradiated onto the first dichroic mirror 10. Out of the light beams irradiated onto the first dichroic mirror 10, R-light beams are reflected thereby and G-light beams and B-light beams are transmitted therethrough.

The R-light beams reflected by the first dichroic mirror 10 are reflected by the reflection mirror 12 and then irradiated onto the first condenser lens 14. The R-light beams converged by the first condenser lens 14 are irradiated onto the first liquid crystal panel 30 and the R-light beams transmitted through the first liquid crystal panel 30 are incident upon the light combination prism 33.

On the other hand, the G-light beams and the B-light beams transmitted through the first dichroic mirror 10 are irradiated onto the second dichroic mirror 11. Out of the G-light beams and the B-light beams irradiated onto the second dichroic mirror 11, the G-light beams are reflected by the second dichroic mirror 11 and the B-light beams are transmitted through the second dichroic mirror 11. The G-light beams reflected by the second dichroic mirror 11 are irradiated onto and converged by the second condenser lens 13 and then irradiated onto the second liquid crystal panel 31. The G-light beams irradiated onto and transmitted through the second liquid crystal panel 31 are irradiated onto the light combination prism 33.

The B-light beams transmitted through the second dichroic mirror 11 are irradiated onto the first relay lens 20. The holding member 1100 supporting the first relay lens 20 is temporarily fixed by the screw 1001 with the upper surface 1005 being brought into contact with the spherical surface 1104 of the cover plate 510. The cover plate 510 is mounted to the base body 500.

Subsequently, the adjusting jig 1300 is arranged in an appropriate position and the chuck members 1201, 1202 are inserted through the adjustment slots 1101, 1102 to be joined to the holding holes 1003, 1004 of the holding member 1100. By angularly adjusting the goniostages 1204, 1205 of the adjusting jig 1300, the first relay lens 20 is adjusted in $\theta_x$, $\theta_y$ directions to make the distribution of illumination on the liquid crystal panel 32 close to those of the first and second liquid crystal panels 30, 31. That is, when the distribution of illumination on the screen is that the distribution of illumination of the B-light beams are made reverse left and right to those of the R-light beams and the G-light beams as shown in FIG. 12B, the angle adjusting means 330 is adjusted to incline the first relay lens 20 to the illumination optical axis 1000.

When the distribution of illumination of the B-light beams are projected onto the screen, the holding member 1100 is turned to determine an angle of inclination of the first relay lens 20 to the illumination optical axis 1000 so that the distribution of illumination of the B-light beams are made the same as those of the R-light beams and the G-light beams. Thereafter, the screw 1001 is used to fix the holding member 1100. After fixation with the screw 1001, the chuck members 1201, 1202 are opened and separated from the holding member 1100, thus permitting the adjusting jig 1300 to be removed.

As described above, the B-light beams, of which distribution of illumination is adjusted on the first relay lens 20 inclined at a predetermined angle to the illumination optical axis 1000 and which are transmitted through the first relay lens 20, are converged in the vicinity of the second relay lens 21 and then transmitted through the second relay lens to be irradiated onto the third relay lens 22 while diverging. The B-light beams irradiated onto the third relay lens 22 are made in parallel to the illumination optical axis 1000 by the third relay lens 22 to be irradiated onto the third liquid crystal panel 32, and the B-light beams transmitted through the third liquid crystal panel 32 are incident upon the light combination prism 33.

The R-light beams, the G-light beams and the B-light beams, which are transmitted through the respective liquid crystal panels, are composed as a color image by the light combination prism 33 being a color composite element, and then pass through the projection lens 34 to reach a screen (not shown). Optical images formed on the respective liquid crystal panels 30, 31, 32 in optical power modulation are projected in magnification onto the screen by the projection lens 34.

As described above, according to the embodiment, even when there is deviation in distribution of illumination, the first relay lens 20 being an incident side lens of the relay optical system is inclined to the illumination optical axis 1000 by the angle adjusting means 330, that is, angularly adjusted whereby it is possible to decrease color shading attributable to deviation in distribution of illumination while adjusting the distribution of illumination of light projected onto the third liquid crystal panel 32 to prevent deterioration in white balance.

Further, the following effects in addition to adjustment of color shading are produced.

(1) By positioning a fixing location of the holding member 1100 on the axis 1006 passing through the turning center 1008 and making the upper surface 1200 of the cover plate 510 columnar-shaped to be centered on the axis 1007 passing through the turning center 1008, the screw 1001 passes on the fixation slot 1103, so that two adjusting operations by $\theta_x$ and $\theta_y$ of the holding member 1100 can be performed only by the single screw 1001. Also, reduction of fixed parts and reduction of a space for a fixation mechanism enable making the projection type image display apparatus small in size.

(2) Since the upper surface 1005 of the holding member 1100 and the spherical surface 1104 of the cover plate 510 define shapes of spherical surfaces centered on the turning center 1008, the turning center 1008 is not moved even when the holding member 1100 is angularly adjusted, so that it is possible to adjust color shading. Also, contact at the spherical surfaces enables making a fixing force constant even when angular adjustment is accomplished.

Subsequently, a second embodiment of the projection type image display apparatus of the invention will be described. While angular adjustment in the first embodiment is accomplished with the use of the adjusting jig 1300, angular adjustment in the second embodiment is accomplished with the use of a structural part instead of the adjusting jig 1300. For the sake of simplicity in explanation, the reference numerals and the coordinate system, which are used in the first embodiment, are used as they are.

Figure 13A:
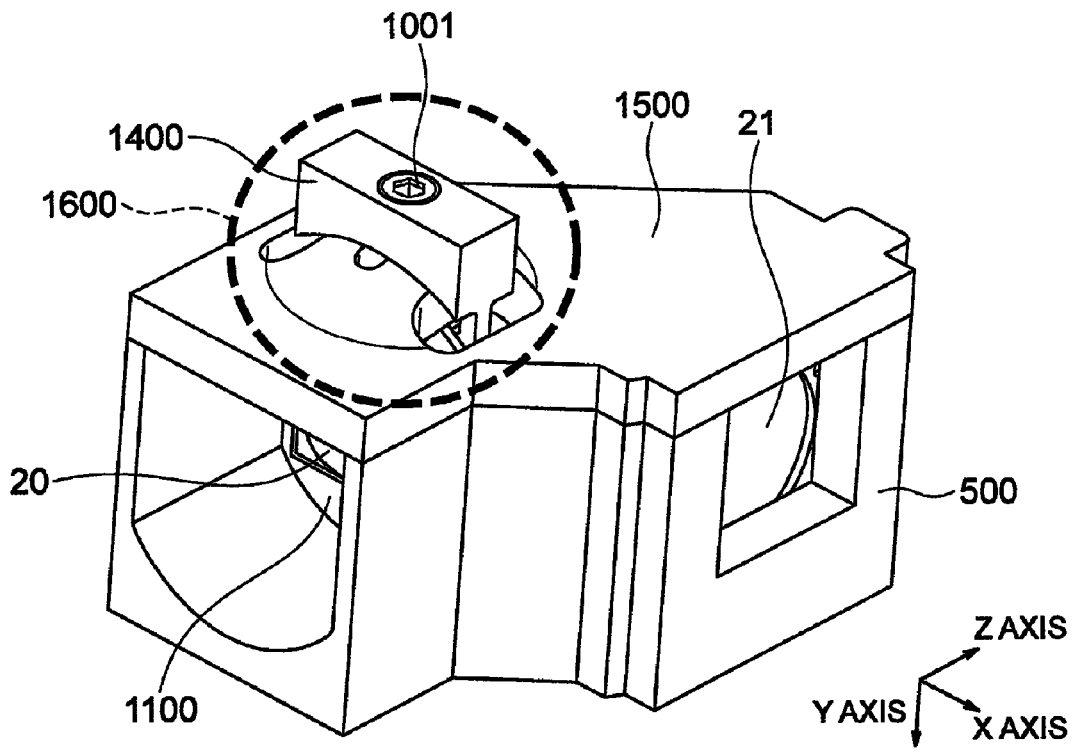
FIGS. 13A and 13B are perspective views showing the neighborhood of angle adjusting means for a first relay lens according to a second embodiment of the projection type image display apparatus according to the invention.
Figure 13B:
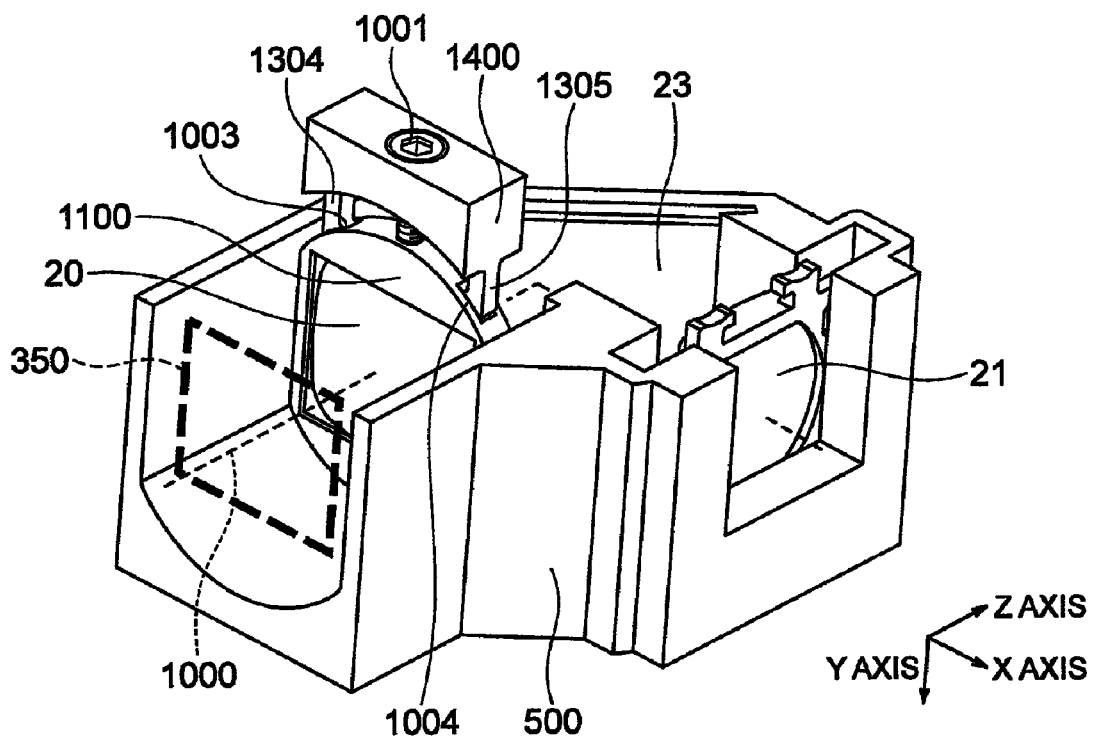

FIG. 13A and FIG. 13B are perspective views showing the neighborhood (a region, in which light transmits through a second relay lens 21 via a reflection mirror 23 from a virtual liquid crystal display image 350) of angle adjusting means 1600 of a first relay lens 20. The reference numeral 1500 in FIG. 13A denotes a cover plate and FIG. 13B is a view with the cover plate 1500 removed for the sake of explanation. Like the first embodiment, optical parts such as the first relay lens 20, etc. are arranged in predetermined positions on a base body 500 and covered by the cover plate 1500.

As shown in FIG. 13B, the angle adjusting means 1600 comprises the cover plate 1500, a screw 1001, a holding member 1100, an angle adjusting member 1400, and chuck members 1304, 1305 of the angle adjusting member 1400 and holding holes 1003, 1004 of the holding member 1100 are joined to each other.

Figure 14:
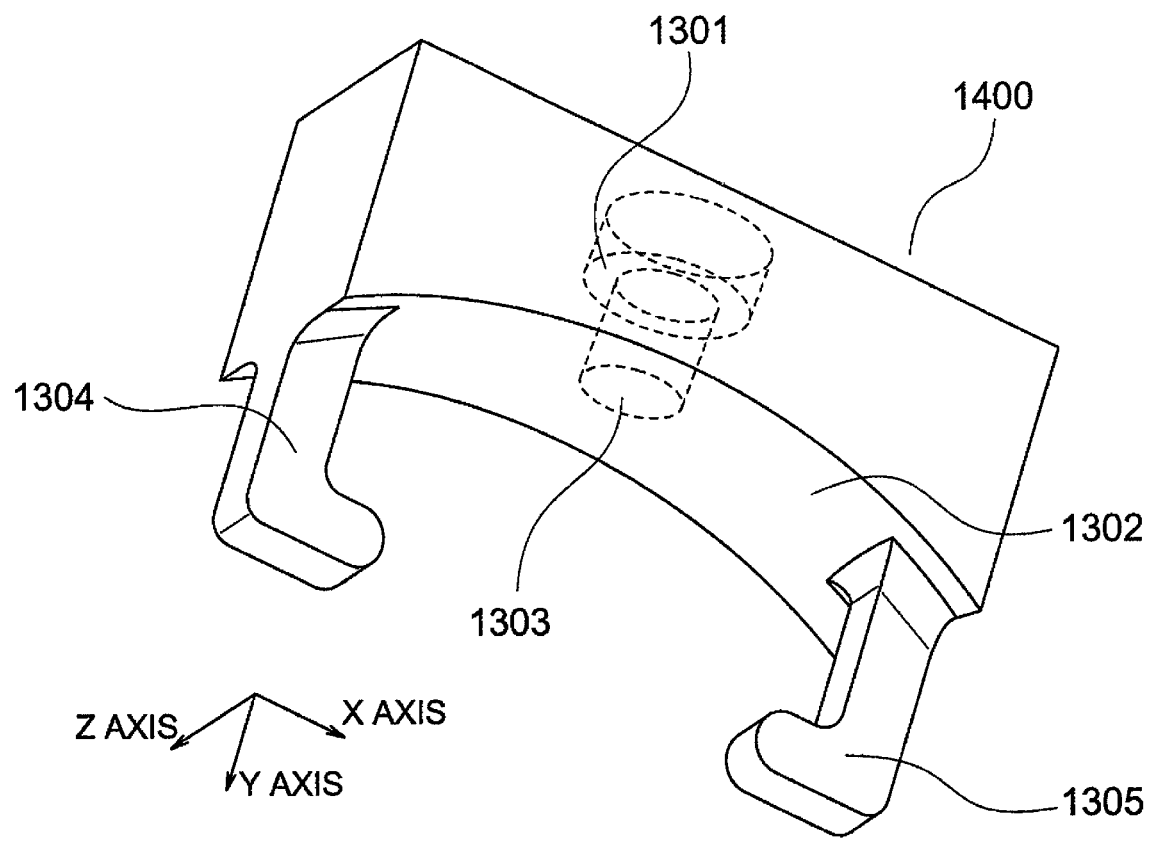
FIG. 14 is a perspective view showing an angle adjusting structural member for the first relay lens in the second embodiment.

FIG. 14 is a perspective view showing the angle adjusting member 1400. The angle adjusting member 1400 comprises a bottom portion 1301, a spherical surface 1302, a screw passing hole 1303, and the chuck members 1304, 1305.

The bottom portion 1301 is planar to permit the screw 1001 to abut thereagainst. The spherical surface 1302 is one centered on a turning center 1008 of the first relay lens 20. The screw passing hole 1303 is one to permit the screw 1001 to extend therethrough and is a little larger than a diameter of thread ridges of the screw 1001. The chuck members 1304, 1305 are joined to the holding holes 1003, 1004 of the holding member 1100.

Figure 15:
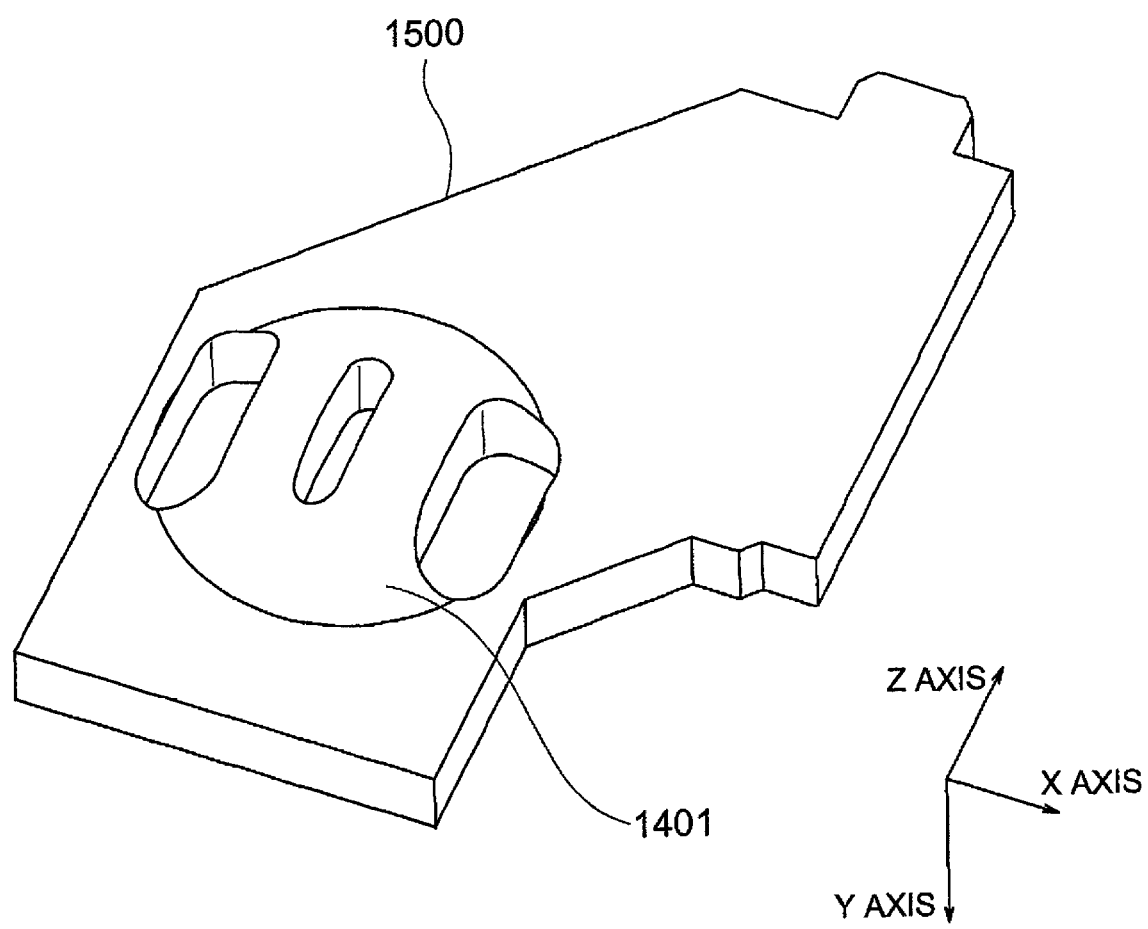
FIG. 15 is a perspective view showing a cover plate in the second embodiment.

FIG. 15 shows the cover plate 1500, to which the holding member 1100 and the angle adjusting member 1400 are mounted. Provided on an upper portion of the cover plate is a spherical surface 1401 having the same curvature as that of the spherical surface 1302 of the angle adjusting member 1400. Since the cover plate 1500 is different only in the spherical surface 1401 from the cover plate 510 in the first embodiment and the same in the remaining portion as the latter, designations and characters of respective portions thereof are made the same as those of the cover plate 510 and an explanation therefor is omitted.

Figure 16A:
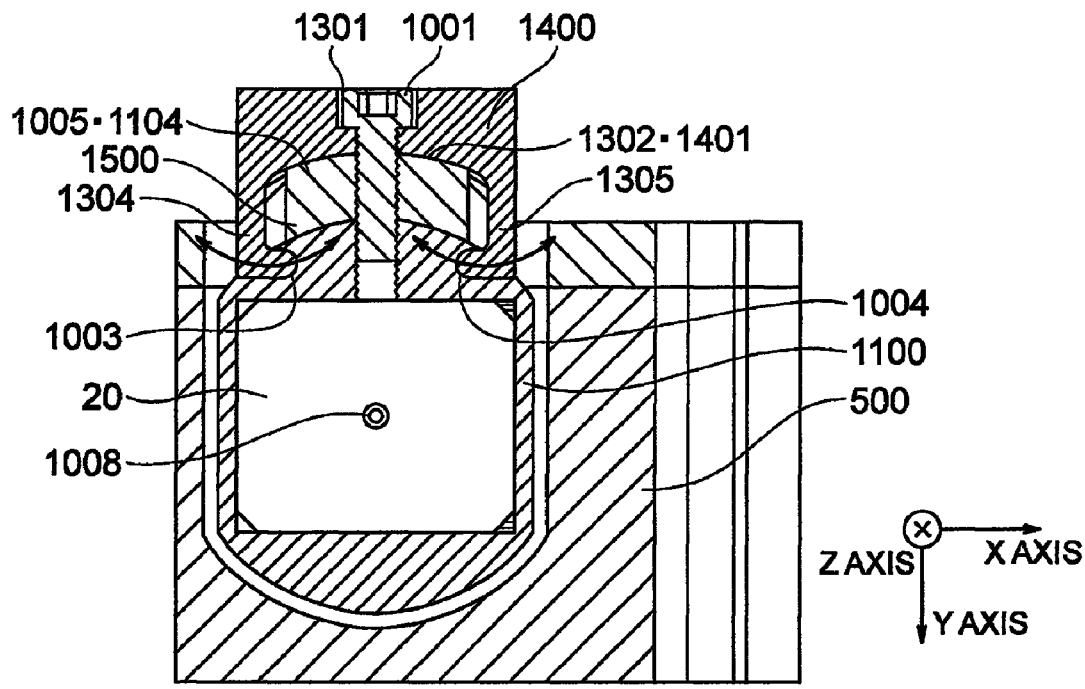
FIGS. 16A and 16B are cross sectional views showing angle adjusting means for the first relay lens in the second embodiment.
Figure 16B:
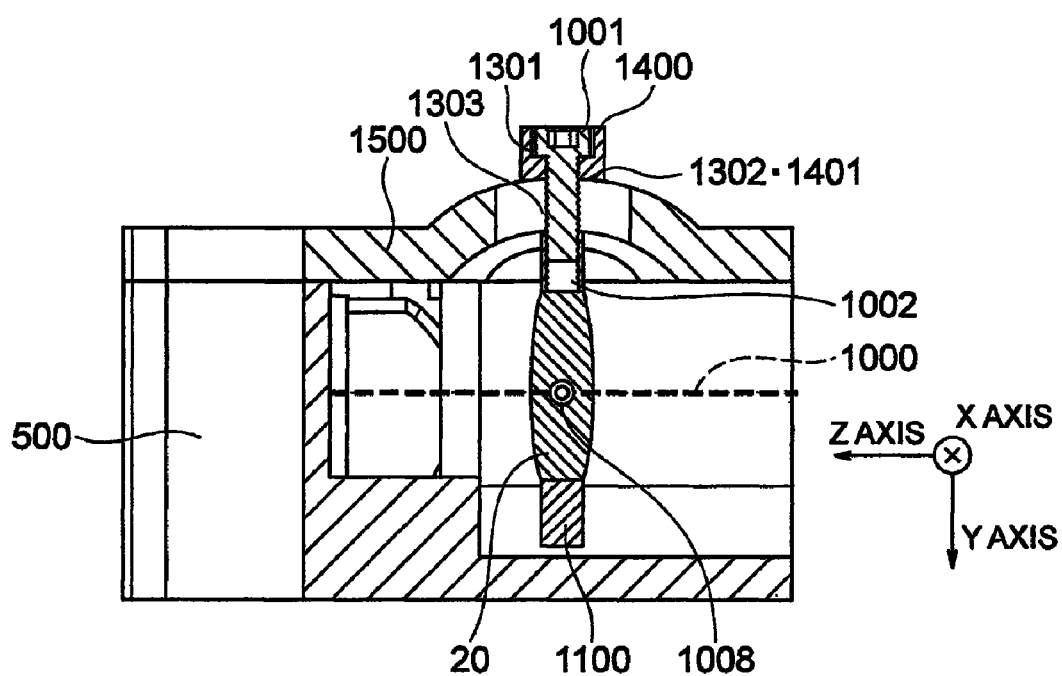

FIG. 16A is a cross sectional view taken along a X-Y plane passing through the turning center 1008 and FIG. 16B is a cross sectional view taken along a Y-Z plane passing through the turning center 1008. As shown in FIGS. 16A and 16B, the chuck members 1304, 1305 are joined to the holding holes 1003, 1004 of the holding member 1100. The angle adjusting member 1400 is made of an elastic body and can be inserted into and joined to the holding holes 1003, 1004 of the holding member 1100 upon elastic deformation of the chuck members 1304, 1305 in an arrow direction.

Subsequently, angular adjustment of the first relay lens 20 will be described with reference to FIGS. 16A and 16B.

First, the holding member 1100 and the angle adjusting member 1400 are joined to each other so as to interpose the cover plate 1500 therebetween. Subsequently, the angle adjusting member 1400 is moved in a state, in which the spherical surface 1302 and the spherical surface 1401 are brought into close contact with each other at all times, whereby the first relay lens 20 is turned in the $\theta_x$ direction and in the $\theta_y$ direction. Since centers of the upper surface 1005, the spherical surface 1104, the spherical surface 1302, and the spherical surface 1401 agree with the turning center 1008, turning in the $\theta_x$ direction and in the $\theta_y$ direction can be made.

After movements in the $\theta_x$ direction and in the $\theta_y$ direction, the screw 1001 is inserted through the screw passing hole 1303 to be fixed to the threaded hole 1002. When the screw abuts against the bottom portion 1301, fixing is completed. Thus the first relay lens 20 is turned in the $\theta_x$ direction and in the $\theta_y$ direction to be fixed.

The second embodiment is the same in operation as the first embodiment except that the adjusting jig 1300 is used to turn the first relay lens 20, and the angle adjusting member 1400 instead of the adjusting jig 1300 is manually moved to accomplish turning.

Therefore, an explanation for the operation of the projection type image display apparatus is omitted. As described above, turning means, which uses the angle adjusting member 1400, that is, the angle adjusting means 1600 angularly adjusts the first relay lens 20 whereby the distribution of illumination of light beams projected onto the third liquid crystal panel 32 is adjusted to enable decreasing color shading attributable to deviation in distribution of illumination while preventing deterioration in white balance.

Also, the following advantages in addition to the advantages listed in the first embodiment are produced.

(1) The bottom portion 1301 is provided on the angle adjusting member 1400 whereby it is possible to fix the screw 1001 over a whole surface thereof even when angular adjustment is accomplished, thus enabling obtaining a further intense fixing force with a further stable holding force.

(2) The angle adjusting member 1400 can be manually adjusted whereby it is possible to simply adjust color shading.

(3) The chuck members 1304, 1305 are formed on the angle adjusting member 1400 and the holding holes 1003, 1004 are formed on the holding member 1100 whereby it is possible to simply mount the holding member 1100 and the angle adjusting member 1400. Thereby, in assembling the projection type image display apparatus, it is unnecessary to mount the screw 1001 until the process of adjustment of color shading and mounting can be accomplished without the use of the adjusting jig, so that the arrangement is suited to production.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A projection type image display apparatus

A projection type image display apparatus comprising:
  a light source;
  an optical integrator for changing distribution of illumination of light outgoing from the light source;
  a color separation optical system for separating the light outgoing from the optical integrator into a plurality of light beams; and
  a relay optical system including a plurality of relay lenses and reflection mirrors for relaying the light beams separated by the color separation optical system;
  wherein the relay optical system includes means for adjusting an inclination angle of at least one of the plurality of relay lenses with respect to an optical axis of illumination of the light outgoing from the light source;
  wherein the relay optical system includes a first relay lens that receives the light from the light source, a reflection mirror that reflects light passing through the first relay lens, and a second relay lens that receives light from the reflection mirror;
  wherein an optical axis direction of the light directed toward the first relay lens from the light source defines a Z-axis;
  wherein an optical axis direction of the light directed toward the second relay lens from the reflection mirror defines a X-axis;

wherein a direction perpendicular to both the Z-axis and the X-axis defines a Y-axis;

wherein the angle adjusting means includes a holding member that holds the first relay lens, a base body that supports the holding member, and a fixation member that fixes the holding member and the base body to each other;

wherein an upper portion of the base body defines a surface substantially parallel to the Z-axis and the X-axis;

wherein that surface of the upper portion of the base body, which is brought into contact with the holding member, defines a spherical surface;

wherein the upper portion of the base body includes an opening extending in the Z-axis direction;

wherein a fixation hole, into which the fixation member enters, is provided on that side of the holding member, which is brought into contact with the upper portion of the base body;

wherein the fixation member is passed through the fixation hole from the opening to fix the holding member to the base body;

wherein the holding member is turnable along the opening in the Z-axis direction to change an angle of the first relay lens about the X-axis; and wherein the holding member is turnable about the fixation member to change an angle about the Y-axis.

2. A projection type image display apparatus

A projection type image display apparatus comprising:
a light source;
an optical integrator for changing distribution of illumination of light outgoing from the light source;
a color separation optical system for separating the light outgoing from the optical integrator into a plurality of light beams; and
a relay optical system including a plurality of relay lenses and reflection mirrors for relaying the light beams separated by the color separation optical system;
wherein the relay optical system includes means for adjusting an inclination angle of at least one of the plurality of relay lenses with respect to an optical axis of illumination of the light outgoing from the light source;
wherein the relay optical system includes a first relay lens that receives the light from the light source, a reflection mirror that reflects light passing through the first relay lens, and a second relay lens that receives light from the reflection mirror;
wherein an optical axis direction of the light directed toward the first relay lens from the light source defines a Z-axis;
wherein an optical axis direction of the light directed toward the second relay lens from the reflection mirror defines a X-axis;
wherein a direction perpendicular to both the Z-axis and the X-axis defines a Y-axis;
wherein the angle adjusting means includes a holding member that holds the first relay lens, a base body that supports the holding member, and a fixation member that fixes the holding member and the base body to each other;
wherein an upper portion of the base body defines a surface substantially parallel to the Z-axis and the Y-axis;

wherein that surface of the upper portion of the base body, which is brought into contact with the holding member, defines a spherical surface;

wherein the upper portion of the base body includes an opening extending in the Z-axis direction;

wherein a fixation hole, into which the fixation member enters, is provided on that side of the holding member, which is brought into contact with the upper portion of the base body;

wherein the fixation member is passed through the fixation hole from the opening to fix the holding member to the base body;

wherein the holding member is movable along the opening in the Z-axis direction to change an angle of the first relay lens about the Y-axis; and wherein the holding member is turnable about the fixation member to change an angle about the X-axis.

3. The projection type image display apparatus according to claim 1, wherein that surface of the holding member, which is brought into contact with the upper portion of the base body, defines a spherical surface.

4. The projection type image display apparatus according to claim 3, wherein that spherical surface of the holding member, which is brought into contact with the upper portion of the base body, and that spherical surface of the upper portion of the base body, which is brought into contact with the holding member, are the same in curvature.

5. The projection type image display apparatus according to claim 3, wherein that spherical surface of the holding member, which is brought into contact with the upper portion of the base body, and that spherical surface of the upper portion of the base body, which is brought into contact with the holding member, define concentric, spherical surfaces.

6. The projection type image display apparatus according to claim 2, wherein that surface of the holding member, which is brought into contact with the upper portion of the base body, defines a spherical surface.

7. The projection type image display apparatus according to claim 6, wherein that spherical surface of the holding member, which is brought into contact with the upper portion of the base body, and that spherical surface of the upper portion of the base body, which is brought into contact with the holding member, are the same in curvature.

8. The projection type image display apparatus according to claim 6, wherein that spherical surface of the holding member, which is brought into contact with the upper portion of the base body, and that spherical surface of the upper portion of the base body, which is brought into contact with the holding member, define concentric, spherical surfaces.

9. A projection type image display apparatus comprising:
a light source;
an optical integrator for changing distribution of illumination of light outgoing from the light source;
a color separation optical system for separating the light outgoing from the optical integrator into a plurality of light beams; and
a relay optical system including a plurality of relay lenses and reflection mirrors for relaying at least one of the light beams separated by the color separation optical system,
wherein the relay optical system includes means for adjusting an inclination angle of at least one of the plurality of relay lenses with respect to an optical axis of illumination of the light outgoing from the light source,
said angle adjusting means comprising: a holding member that holds said at least one of the relay lenses; a base body that supports the holding member; a cover plate for covering the base body and a screw that fixes the holding member to the cover plate, said cover plate having a spherical surface, of which center is located on the optical axis, on a bottom surface thereof, a cylindrical surface, of which central axis intersects the optical axis at a right angle, on an upper surface thereof, a fixation slot extending in a direction of the optical axis and two angle adjustment slots extending in the direction of the optical axis, said holding member having a spherical surface, of which center is located at the center of the spherical surface of the cover plate, on an upper surface thereof and which is brought into contact with the spherical surface of the cover plate, a threaded hole provided on the upper surface thereof and holding holes provided on the upper surface thereof and joinable to chuck members of a jig passing through the angle adjustment slots of the cover plate, said screw being engageable with the threaded hole of the holding member through the fixation slot of the cover plate to fix the holding member to the cover plate, whereby the angle of the at least one of the relay lenses is adjusted by moving the screw along the fixation slot and/or around its axis.

10. A projection type image display apparatus comprising:

a light source;

an optical integrator for changing distribution of illumination of light outgoing from the light source;

a color separation optical system for separating the light outgoing from the optical integrator into a plurality of light beams; and a relay optical system including a plurality of relay lenses and reflection mirrors for relaying at least one of the light beams separated by the color separation optical system, wherein the relay optical system includes means for adjusting an inclination angle of at least one of the plurality of relay lenses with respect to an optical axis of illumination of the light outgoing from the light source, said angle adjusting means comprising: a holding member that holds said at least one of the relay lens; a base body that supports the holding member; a cover plate for covering the base body, an angle adjusting member having elastic chucks and a screw that fixes the holding member to the cover plate, said cover plate having a first spherical surface, of which center is located on the optical axis, on a bottom surface thereof, a second spherical surface, which is concentric with the first spherical surface, on an upper surface thereof, a fixation slot extending in a direction of the optical axis and two angle adjustment slots extending in the direction of the optical axis, said holding member having a spherical surface concentric with the first spherical surface of the cover plate, on an upper surface thereof and which is brought into contact with the first spherical surface of the cover plate, a threaded hole provided on the upper surface thereof and holding holes provided on the upper surface thereof, said angle adjusting member having a bottom surface concentric with the second spherical surface of the cover plate and said elastic chucks being joinable with the holding holes of the holding member, said screw being engageable with the threaded hole of the holding member through the fixation slot of the cover plate to fix the holding member to the cover plate, whereby the angle of the at least one of the relay lenses is adjusted by moving the screw along the fixation slot and/or around its axis.

\* \* \* \* \*